Patented May 8, 1928.

1,668,741

UNITED STATES PATENT OFFICE.

LESLIE R. STEELE, OF BOULDER, COLORADO.

METHOD OF MAKING STORAGE BATTERIES.

No Drawing. Original application filed February 28, 1923, Serial No. 621,946. Divided and this application filed May 1, 1923. Serial No. 635,960.

This invention relates to methods of making storage batteries and aims to provide a method for making a dry storage battery.

The present application is a division of my application filed February 28, 1923, Serial No. 621,946, the said application being a continuation in my part of my previous application filed March 2, 1922, Serial No. 540,659.

The inconvenience involved in the use of a liquid electrolyte in storage batteries has long been recognized. Many attempts have been made to lessen this inconvenience in batteries of the Planté type by placing between the lead plates a porous filler of either a granular or a colloidal nature. In such batteries, the electrolyte has consisted of dilute sulfuric acid absorbed in the pores of the filler. Such batteries have, however, proved incapable of successful operation. I believe the reason for this to be that in such batteries the filler obstructs the ionic migration which must take place through the electrolyte during the charging and discharging of a Planté battery.

I have invented a battery which has lead plates of the type used in the Planté battery and a non-fluid electrolyte which reacts with these plates in the charging and discharging of the battery. The battery differs from those which have been made heretofore in that the electrolyte itself is a non-fluid mass, usually a solid, and not merely a liquid, sulfuric acid, absorbed in the pores of a solid, or semi-solid, or colloidal filler.

The electrolyte of my battery comprises a non-fluid, and usually solid, chemical compound which reacts directly with the lead plates during the discharging and charging of the battery. This compound contains the sulfate radical and, so far as the action of this radical is concerned, the reactions between the electrolyte and the plates are similar to those which occur in a Planté battery.

The battery which I have invented and its electrolyte form the subject-matter of the ed claims of my aforesaid application filed February 28, 1923, Serial No. 621,946. The present application is directed to a method which I have invented for making a dry storage battery of the type claimed in that application. In order that the present invention may clearly be understood, I will describe in detail a specific method embodying it.

*Preparation of electrolyte.*—The ingredients from which the electrolyte is made consist of the following compounds used in the proportions stated:

|                   | Per cent. |
|-------------------|-----------|
| Sodium silicate   | 95        |
| Ammonium sulfate  | 5         |

Commercial sodium silicate and commercial ammonium sulfate may be used, as it is not essential that either of these ingredients be chemically pure.

The first step in the preparation of the electrolyte consists in dissolving the sodium silicate in about ten per cent water, and adding the ammonium sulfate in powdered form to this solution. As the ammonium sulfate powder is added, the solution is stirred vigorously. The two ingredients react to form a mass which solidifies and hardens.

The next step consists in grinding or otherwise comminuting the hardened mass to a powder of the fineness of flour. During the grinding, the compound is oxidized to some extent by combining with oxygen in the atmosphere. I find it desirable to continue this oxidization by exposing the powder to the air for several days after the grinding is completed.

The next step consists in mixing 70 parts of this powder with 30 parts of water. The mixture is thoroughly stirred so as to maintain the powder in suspension in the water.

*Preparation of plates.*—The anodes and cathodes of my battery are lead plates of the type used in a Planté battery. By the expression "lead plates" I intend to include all type of anodes and cathodes having lead or compounds of lead as their active element, and suitable for use in a Planté battery, regardless of the physical arrangement or mechanical construction of the " plates ".

In preparing the plates for my battery, I take plates coated, respectively, with lead peroxide and spongy lead, and immerse these plates in an electrolyte of dilute sulfuric acid so as to make an ordinary Planté battery. Only two plates may be used so as to form a battery of a single cell, or a plurality of plates fixed in a casing or container for the electrolyte may be used so as to form a battery identical with any of the known commercial types of Planté battery. After this battery has been charged to its maximum capacity, it is discharged slowly to a voltage of approximately 1.7 per cell. This, as is well understood, results in forming lead sulfate on each of the plates.

The plates are then removed from the sulfuric acid electrolyte and are ready for use in my battery. If the plates are fixed in a container, as in any of the usual commercial types of the Planté battery, this step may be carried out by simply pouring the sulfuric acid electrolyte from the container.

*Preparation of battery.*—After the plates have been prepared as described, they are placed in the water suspension of the powdered compound prepared as described. This may most conveniently be done by pouring the water suspension of the compound into a container in which the plates are fixed.

The battery is then charged in the usual way. During this charging, the electrolyte, which, when placed in the battery, was in the form of an insoluble powder suspended in water, becomes a hard, dense mass. A liquid rises to the top of this mass during the charging, and when the charging is complete, this liquid is drawn off. If the electrolyte then shows an acid reaction, indicating that some sulfuric acid is present, ammonia water is added to an extent sufficient to neutralize this acid.

The battery is then ready for use.

The battery is used in the same manner as an ordinary storage battery and may be charged and discharged as often as required. It has a number of advantages over ordinary storage batteries. The most important of these is that as the battery contains no fluid, it may be handled and used on vehicles, boats, vessels, and other moving objects, without danger or inconvenience. The non-fluid electrolyte, besides being unspillable, serves as a support for the plates and gives the battery such strength that it can withstand shocks and jars without injury. A further advantage of the battery lies in the fact that it may be completely discharged without injury either to the plates or to the electrolyte. Furthermore, the battery may be very rapidly discharged, for example, by direct short circuit, or very rapidly charged, without developing nearly as much heat as would be developed in a Planté battery under the same circumstances, and without injuring the battery. The battery gives off practically no gas either in discharging or charging.

My invention is by no means limited to the specific method which has been described for the sake of illustration. I shall not attempt to indicate, otherwise than in the claims which follow, the changes which may be made in this specific method without departing from my invention. I will, however, list briefly certain variations in the method described which I have ascertained by experiment to be permissible.

In making the electrolyte, the proportions of the ingredients used may be varied at least to the following extent: The proportion of sodium silicate may be varied from 65% to 97%. The proportion of ammonium sulfate may be varied from 35% to 3%. Chemical equivalents may be substituted for the ingredients mentioned, and limited quantities of other substances may, if desired, be mixed with these ingredients.

The step of combining oxygen with the electrolyte compound when in powdered form may be accomplished by means of an oxidizing agent other than air, or by adding to the powder a compound containing an excess of oxygen. Furthermore, it is not essential that the oxygen be combined with the compound before the compound is placed in the battery, since, if this step is omitted, oxygen is combined with the compound during the initial charging and discharging of the battery. In this case, gas is given off by the battery during the first few cycles of charging and discharging, but the amount of gas given off becomes less after each cycle until it is practically negligible.

The plates may be prepared by coating them with lead sulfate in a manner other than that which has been described.

The step of neutralizing any acid present after the first charging of the battery may be omitted, for, while I believe that the electrolyte consists essentially of one or more neutral compounds, a slight excess either of acid or of alkali in the electrolyte does not seriously interfere with the operation of the battery.

What I claim is:

1. A method of making a storage battery, comprising discharging a Planté type battery to a voltage of approximately 1.7 per cell, and removing the sulfuric acid electrolyte and substituting a water suspension of a powdered compound formed by the reaction of the ammonium sulfate with a silicate in aqueous solution.

2. A method of making a storage battery, comprising discharging a Planté type battery to a voltage of approximately 1.7 per cell, removing the sulfuric acid electrolyte and substituting a water suspension of a powdered compound formed by the reaction of the ammonium sulfate with a silicate in aqueous solution, charging the battery, and withdrawing the free liquid.

3. A method of making a storage battery, comprising discharging a Planté type battery to a voltage of approximately 1.7 per cell, removing the sulfuric acid electrolyte and substituting a water suspension of a powdered compound formed by the reaction of the ammonium sulfate with a silicate in aqueous solution, charging the battery, withdrawing the free liquid, and adding sufficient ammonia water to neutralize any sulfuric acid present.

4. A method of making a storage battery which comprises mixing ammonium sulfate with a silicate in aqueous solution, comminuting the resulting compound and suspending it in water, removing the sulfuric acid electrolyte from a Planté type battery which has been discharged to a voltage of approximately 1.7 per cell, and substituting said suspension.

5. A method of making a storage battery which comprises mixing ammonium sulfate with a silicate in aqueous solution, comminuting the resulting compound, combining oxygen with it, and then suspending it in water, removing the sulfuric acid electrolyte from a Planté type storage battery which has been discharged to a voltage of approximately 1.7 per cell, and substituting said suspension.

In testimony whereof, I have hereunto set my hand.

LESLIE R. STEELE.

CERTIFICATE OF CORRECTION.

Patent No. 1,668,741.                                      Granted May 8, 1928, to

LESLIE R. STEELE.

It is hereby certified that error appears in the printed specification of the above numbered patent requiring correction as follows: Page 1, line 7, strike out the word "my"; line 48, strike out the syllable "ed"; line 95, for the word "type" read "types", and line 100, for the word "for" read "of"; and that the said Letters Patent should be read with these corrections therein that the same may conform to the record of the case in the Patent Office.

Signed and sealed this 31st day of July, A. D. 1928.

(Seal)

M. J. Moore,
Acting Commissioner of Patents.